(12) United States Patent
Joyce

(10) Patent No.: US 7,214,420 B2
(45) Date of Patent: May 8, 2007

(54) MOLDED ARTICLE

(76) Inventor: Robert Joyce, 7319 Twin Canyon, Lambertville, MI (US) 48144

( * ) Notice: Subject to any disclaimer, the term of this patent is extended or adjusted under 35 U.S.C. 154(b) by 0 days.

(21) Appl. No.: 11/134,930

(22) Filed: May 23, 2005

(65) Prior Publication Data

US 2006/0263591 A1   Nov. 23, 2006

(51) Int. Cl.
*B32B 5/20* (2006.01)
(52) U.S. Cl. .................. 428/318.8; 428/319.3; 428/319.7; 428/317.9; 428/131; 428/318.6
(58) Field of Classification Search ............ 428/317.9, 428/313.3, 313.5, 318.8, 318.6, 319.3, 319.7, 428/131
See application file for complete search history.

(56) References Cited

U.S. PATENT DOCUMENTS

| | | | |
|---|---|---|---|
| 4,101,617 A | | 7/1978 | Friederich |
| 4,187,068 A | * | 2/1980 | Vassar .................. 425/381 |
| 5,858,493 A | * | 1/1999 | Sandt .................. 428/36.91 |
| 5,948,524 A | | 9/1999 | Seethamraju et al. |
| 6,344,268 B1 | | 2/2002 | Stucky et al. |
| 6,630,086 B1 | * | 10/2003 | Goral et al. ............... 264/40.4 |
| 6,645,587 B1 | | 11/2003 | Guergov |
| 6,821,476 B2 | | 11/2004 | McClelland et al. |
| 6,827,995 B2 | * | 12/2004 | Hughes et al. ............. 428/36.5 |
| 2002/0018907 A1 | * | 2/2002 | Zehner .................... 428/537.1 |
| 2003/0021915 A1 | * | 1/2003 | Rohatgi et al. |
| 2004/0026679 A1 | * | 2/2004 | Terrels et al. ............ 256/65.03 |
| 2004/0084795 A1 | * | 5/2004 | Hornsby et al. ............... 264/41 |
| 2004/0147625 A1 | * | 7/2004 | Dostal et al. |
| 2005/0045862 A1 | * | 3/2005 | Cook et al. |
| 2005/0279707 A1 | * | 12/2005 | Matthews et al. .......... 210/634 |

FOREIGN PATENT DOCUMENTS

WO   WO 200288233 A1 * 11/2002

* cited by examiner

*Primary Examiner*—Hai Vo
(74) *Attorney, Agent, or Firm*—David C. Purdue; John C. Purdue

(57) ABSTRACT

A longitudinally extending cellular body of a wood plastic composite is disclosed. The body has at least one wall which extends at least substantially the longitudinal length of the body, and encloses a central cavity which extends a distance that is less than the longitudinal length of said body. The cellular body has an impervious integral skin and has an exterior surface which is smooth to the touch. The surface has voids and has the appearance of wood. When the cellular body is struck, it makes a sound like the sound of a piece of wood being struck.

15 Claims, 4 Drawing Sheets

MOLDED ARTICLE

BACKGROUND OF THE INVENTION

This invention relates to a molded article and, more particularly, to a molded article that can be produced by a fluid assisted injection molding method. In a preferred embodiment, the article is produced from a moldable composition which comprises a wood composite concentrate consisting of a polyolefin, most desirably polyethylene or polypropylene, and wood flour, a coupling agent, and a neat polyolefin. Nitrogen gas is the preferred fluid used to assist molding. Preferably, the composition also includes a pigment. The molded article produced by injecting into a mold a quantity of such a composition that is insufficient to fill the mold has smooth exterior surfaces which conform to the shape of the mold, an interior void adjacent a smooth surface and a cellular interior wall or cellular interior walls

THE PRIOR ART

Fluid assisted injection molding has been known for nearly thirty years, being disclosed in U.S. Pat. No. 4,101,617, Friederich. The abstract of this patent, which illustrates fluid assisted molding, reads as follows:

"A method for making a hollow shaped body from a thermoplastic resin by injection molding, which method comprises injecting an amount of molten resin sufficient for the preparation of the hollow shaped body from an injection nozzle into a mold through an injection aperture in said mold, injecting gas under pressure through said injection nozzle and aperture to expand and distribute the molten resin over the interior surfaces of the mold, whereby said hollow shaped body is formed within said mold with a gas-entry opening in said hollow shaped body, cooling the hollow shaped resin body so formed to a temperature beneath the softening point of the resin, opening the interior of the hollow shaped body to equalize the pressure therein with ambient pressure, and then opening said mold to remove said hollow shaped body."

Many patents dealing with fluid assisted injection molding have issued since the above Friederich patent. So far as is known, however, none of these patents suggests the molded article of the instant invention.

SUMMARY OF THE INVENTION

The invention is a cellular body of a polyolefin containing wood flour with at least one integral exterior surface which is smooth to the touch. The preferred polyolefins are polyethylene and polypropylene. This polyolefin and wood flour body can also contain a filler or fillers such as fibrous glass, talc, minerals and natural fibers. Preferably, the body also contains a pigment, most desirably a sufficient amount of a brown pigment that the color of the molded body simulates that of finished natural wood. The cellular body preferably contains a sufficient amount of wood flour that, when the body is struck, there is a sound like the sound of a piece of wood being struck, as distinguished from the sound made when a body made primarily of polyolefin is struck. The cellular body has an appearance which simulates the appearance of wood. The cellular body is preferably made from a mixture that contains a coupling agent that facilitates binding between the wood and any other filler, such as glass, and the polyolefin.

OBJECTS OF THE INVENTION AND DESCRIPTION OF THE DRAWINGS

It is an object of the instant invention to provide a new article of manufacture which has smooth exterior surfaces which conform to the shape of a mold in which it was produced, at least one interior void adjacent a smooth surface and a cellular interior wall or cellular interior walls.

It is another object to provide a method for producing such an article.

It is yet another object of the invention to provide a cellular body of substantial length made from wood composite.

Other objects and advantages will be apparent from the description which follows, reference being made to the attached drawings, in which.

DETAILED DESCRIPTION OF THE PREFERRED EMBODIMENTS

Figures 1, 2:
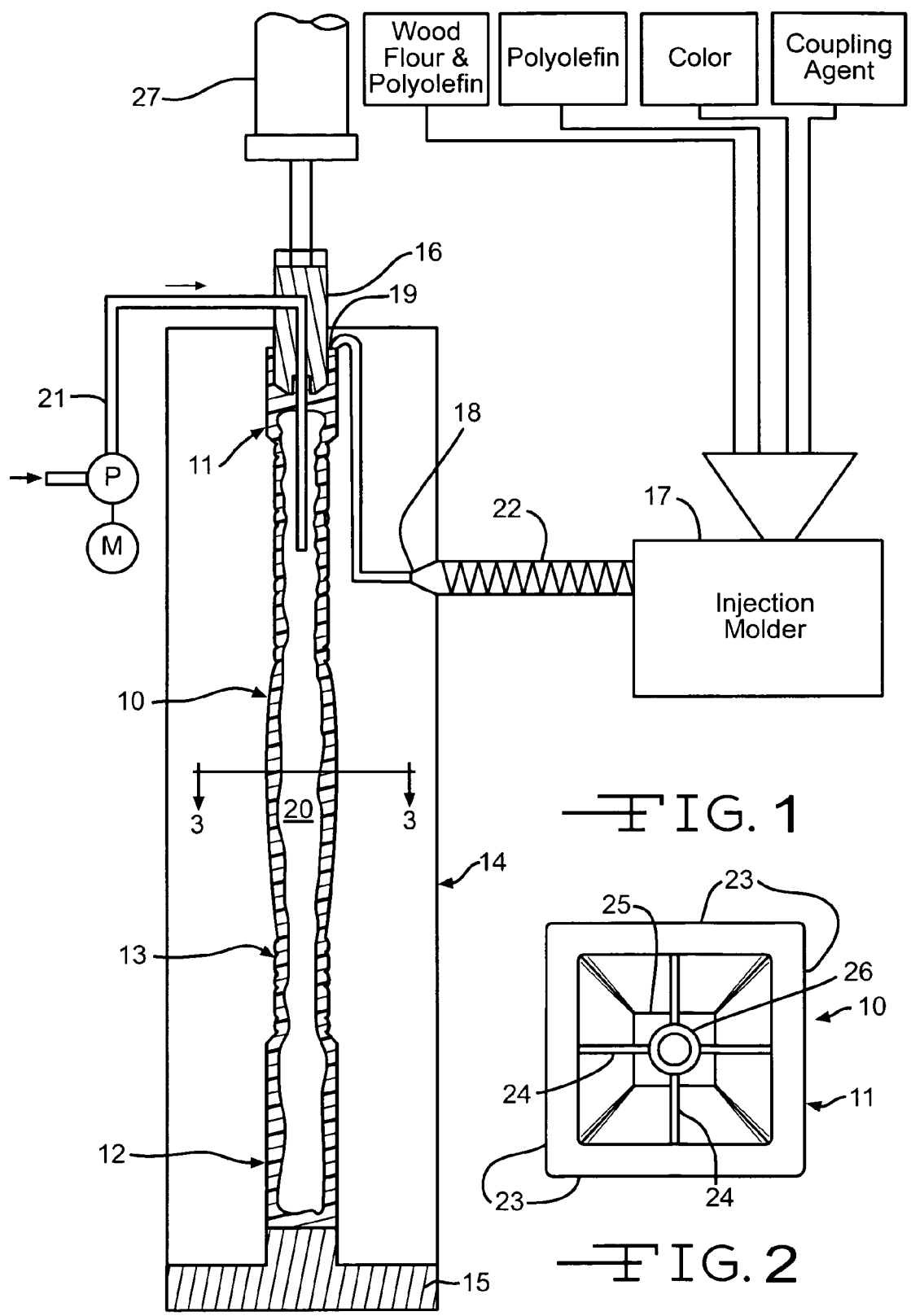
FIG. 1 is a view in vertical section showing a mold and an article of manufacture according to the invention that has been produced in the mold.
FIG. 2 is a top view showing additional details of the article of manufacture according to the invention which is shown in FIG. 1.

An article according to the invention is indicated generally at 10 in FIGS. 1, 2, 3 and 4. The article 10 (see FIG. 1) is a spindle for a stairway railing or a deck rail, for example, having end portions 11 and 12 which are square in cross section, and a central portion 13 which is circular in cross section, and varies in diameter so that the spindle 10 has the appearance of one which can be produced with a lathe from wooden stock having a square cross section. The central portion 13 of the article 10 has an intermediate part which varies in diameter from a minimum adjacent the end portion 12 to a maximum at an intermediate point and back to the minimum adjacent the end portion 11.

The article 10 is produced in a mold composed of two matching mold parts, one of which is designated generally at 14 in FIG. 1. When the mold part 14 and a cooperating mold part (not illustrated) are mounted on platens (not shown) on a press and brought together, they form a mold with an interior cavity which corresponds with the exterior shape of the article 10, and extends substantially vertically from the bottom of the cavity, where it is closed by an insert 15, to the top, where it is closed by an insert 16. The interior cavity varies in cross-section from about 0.6 square inch to about 1.7 square inches.

While the inserts 15 and 16 are urged into seated relationship with the completed mold, a heated mixture of wood composite concentrate consisting of a polyolefin material and wood flour, a pigment, a neat polyolefin material and a coupling agent is extruded from an injection molder 17, through a sprue 18 and a gate 19 and into a mold cavity 20, which is approximately 29 inches in length. As the mixture is flowing into the mold cavity, a fluid, e.g., pressurized nitrogen gas, is introduced into the interior of the mold, flowing through a conduit 21, a portion of which is carried in the insert 16, and it forces the polyolefin material against the walls which surround and define the mold cavity 20, and downwardly through the mold. The cavity 20 of the mold, between the inserts 15 and 16, has a volume approximately equal to that of 880 grams of the extrusion mixture composed of the wood composite concentrate, the neat polyolefin material, pigment and coupling agent that is extruded into the cavity 20 of the mold.

The following Example describes the production of an article 10 in a mold composed of the mold part 14 and the mated, complementary mold part.

EXAMPLE

The injection molder 17 was charged with pelletized wood composite concentrate and pelletized neat polypropylene, pigment and a coupling agent to produce a composite extrusion mix comprising about 40 parts by weight of wood flour (oak), about 56 parts by weight of polypropylene, about 2½ parts by weight of a pigment and about 2½ parts by weight of a coupling agent. These materials were charged to the injection molder in the indicated proportions from feeders which are designated by legend in FIG. 1. They were mixed in the molder to form a composite mix, and the composite mix was heated to a temperature of about 360 degrees F. (~185° C.). A mold charge of about 430 grams of the composite mix was delivered to a screw feeder 22 and by the screw feeder 22 through the sprue 18 and the gate 19 to the interior of the mold cavity 20 by which time the temperature of the composite mix had cooled some twenty or thirty degrees F. The mold formed by the mold part 14 and the cooperating mold part (not shown) are maintained at a temperature of about 60 degrees F. (~15° C.). The screw feeder 22 delivers the composite mix at an injection pressure of about 100 to 120 psig into and through the sprue 18, through the gate 19 and from thence into the interior of the mold cavity 20. As the composite mix was being injected into the mold cavity 20, nitrogen gas, at a specific flow profile flows through and is delivered through the conduit 21 into the mold cavity 20 during a pressure cycle that lasted about 25 or 30 seconds. During the pressure cycle, the pressure at which the nitrogen gas was delivered was ramped up several times, periodically, until it reached about 3,000 to 5,000 psig. The nitrogen gas served to force the composite mix into contact with the mold walls and all the way down to the bottom of the mold. At the end of the pressure cycle, the flow of nitrogen to the cavity 20 was stopped and the pressurized nitrogen in the mold cavity was vented through the conduit 21 and the portion of the conduit 21 that was extended into the mold cavity 20 was withdrawn. After a short dwell or cooling time of 20 seconds, the mold part 14 and the cooperating mold part (not illustrated) were disassembled and the article 10 was separated from the mold. The mold part 14 and the cooperating mold part (not illustrated) were reassembled, the inserts 15 and 16 were reinserted in the mold, and the procedure described above was repeated to produce another article 10. The cycle time was less than 55 seconds per article 10. The article 10 was cool enough that it could be picked out of the mold with bare hands.

It has been found that wood composite mixes containing polypropylene and high levels of wood flour (40%) material, as described in the foregoing Example, are difficult to mold and parts as long as twenty nine inches can't be successfully molded in conventional injection molding equipment. For example, surface voids and flow problems were encountered when such a composition was used in a conventional injection molding machine in a mold like the one described above. In the procedure of the Example, the high nitrogen pressure used, the vertical position of the mold and the location of the outlets through which nitrogen and the polypropylene composition were introduced into the mold all contributed to the desired result of a long article with walls of relatively uniform thickness and an interior cavity.

The procedure of the Example produced a part with a cellular wall which averaged about ¼ inch in thickness wherein diameter of the cells ranged from about 0.040 to 0.090 inch in thickness. The concentration of cells was lower in portions of the part that were adjacent to the conduit through which the fluid, e.g. nitrogen, was delivered into the mold cavity than in portions of the part that were remote from the conduit.

The neat polypropylene pellets used as described above are commercially available from Exxon Mobil under the trade designation 8242 or 7684 KN.

The wood composite concentrate pellets of wood flour and polypropylene used as described contain 60 percent by weight of 80 mesh hardwood flour and 40 percent by weight of polypropylene. They are commercially available from Onaga Composites under the trade designation 60/40 wood composite concentrate.

The pigment pellets used as described are commercially available from Advanced Color Concentrates under designations including redwood, cedar and others.

The coupling agent used as described is commercially available from DuPont under the trade designation MA-grafted Fusabond MD-353D.

The cross section of the top end portion 11 of the article 10, as stated above, is square but can be of a round and/or of a circular shape. As shown in FIG. 2, the square top end portion 11 is formed by walls 23, and there are walls 24 inside and integral with those walls 23. The walls 24 are also integral with a web which closes the end portion 11, and includes, a boss 25 which, in turn, supports a tube 26, through which the conduit 21 extends during production of the article 10. The tube 26 is further supported by being connected to the walls 23 through the walls 24. Preferably, the tube is 1 to 2 inches long and is firmly and strongly supported in the end 11 of the article 10 so that a screw (S in FIG. 4) screwed into the tube 26 will be firmly, rigidly and reliably secured to the article 10. This facilitates the connection of the article 10 to a rail R, for example. The upper portions of the walls 23 are formed in part by the insert 16 (FIG. 1) which is attached to a cylinder 27 for extension and retraction during the molding cycle.

The article 10 produced as described above was found to have an exterior, smooth-feeling, impervious skin 28 (FIG. 3), an interior, smooth-feeling, impervious skin 29, and a cellular body 30 of the wood plastic composite mix between the two surfaces. Voids 31 were visible to the naked eye in the wood plastic composite mix cellular body, as were particles 32 of the pigment from the charge used to produce the article 10. The voids 31 gave the body 30 its cellular structure.

Figure 3:
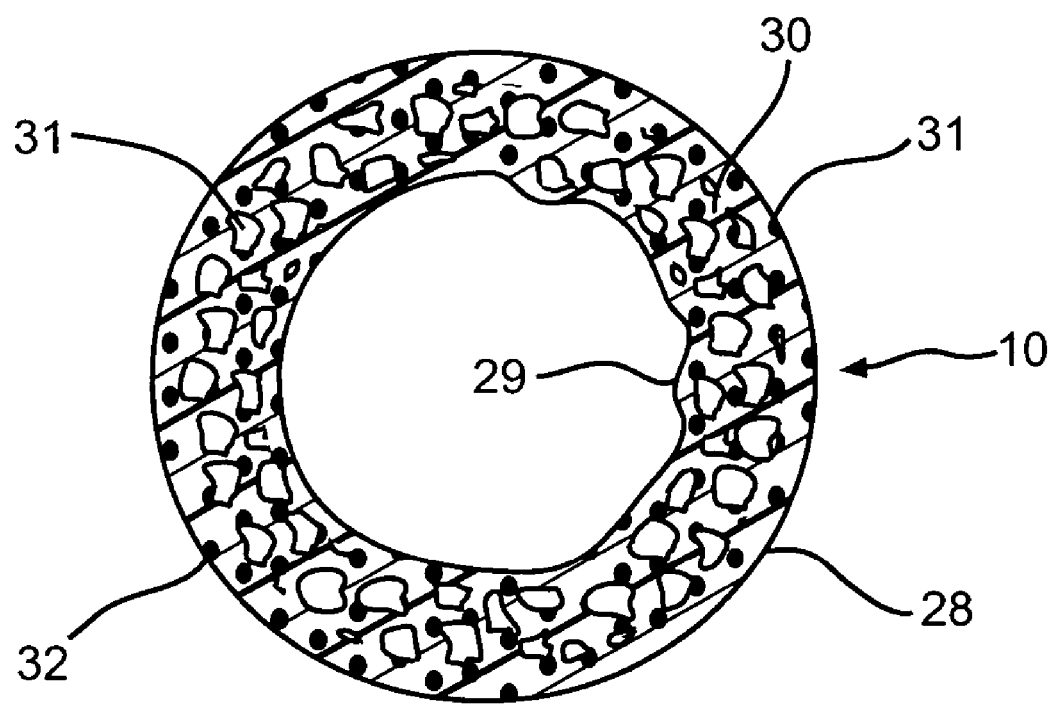
FIG. 3 is a sectional view taken along the line 3—3 of FIG. 1, and showing further details of the FIG. 1 article of manufacture.
Figure 4:
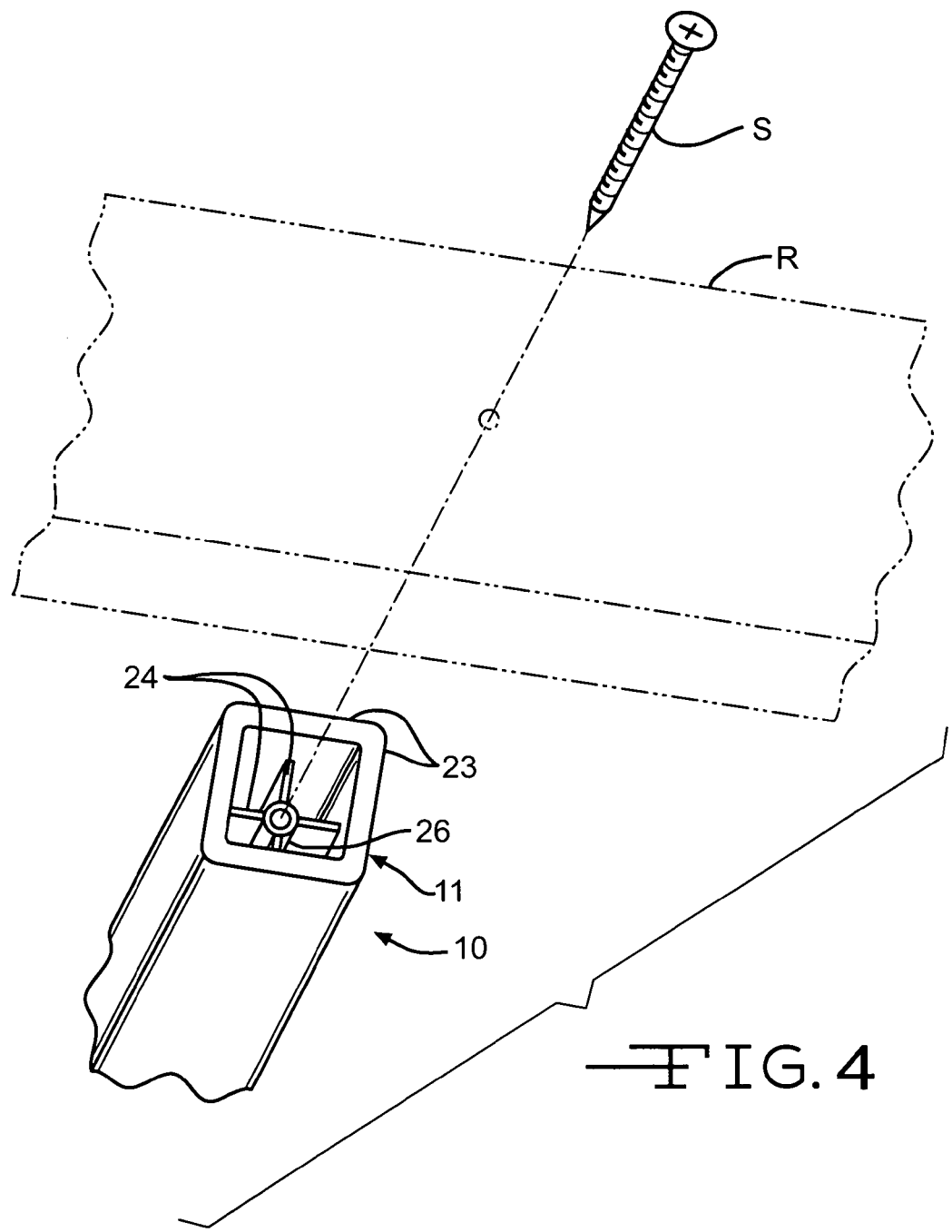
FIG. 4 is a perspective view looking down into the top of the article of manufacture which is shown in FIGS. 1 and 2.

The end portion 11 of the article 10 (FIG. 4) has a similar cellular structure; however, the voids are not as large as the voids in the cross section illustrated in FIG. 3, nor were they as plentiful. It has been found that the smaller the wood fibers used the smaller the cells in the article. The size of the cells in the article is also influenced by other factors, including but not limited to the pressure of the fluid or nitrogen gas, the amount of wood flour, the size of the wood flour particles, and the temperature and viscosity of the composite mix delivered into the mold. Further, the cellularity of the article is not necessarily uniform and, in fact, there appear to be fewer cells in the portion of the article adjacent to the fluid conduit where the fluid, e.g., nitrogen, is delivered into the mold cavity than in portions of the article remote therefrom.

Figure 5:
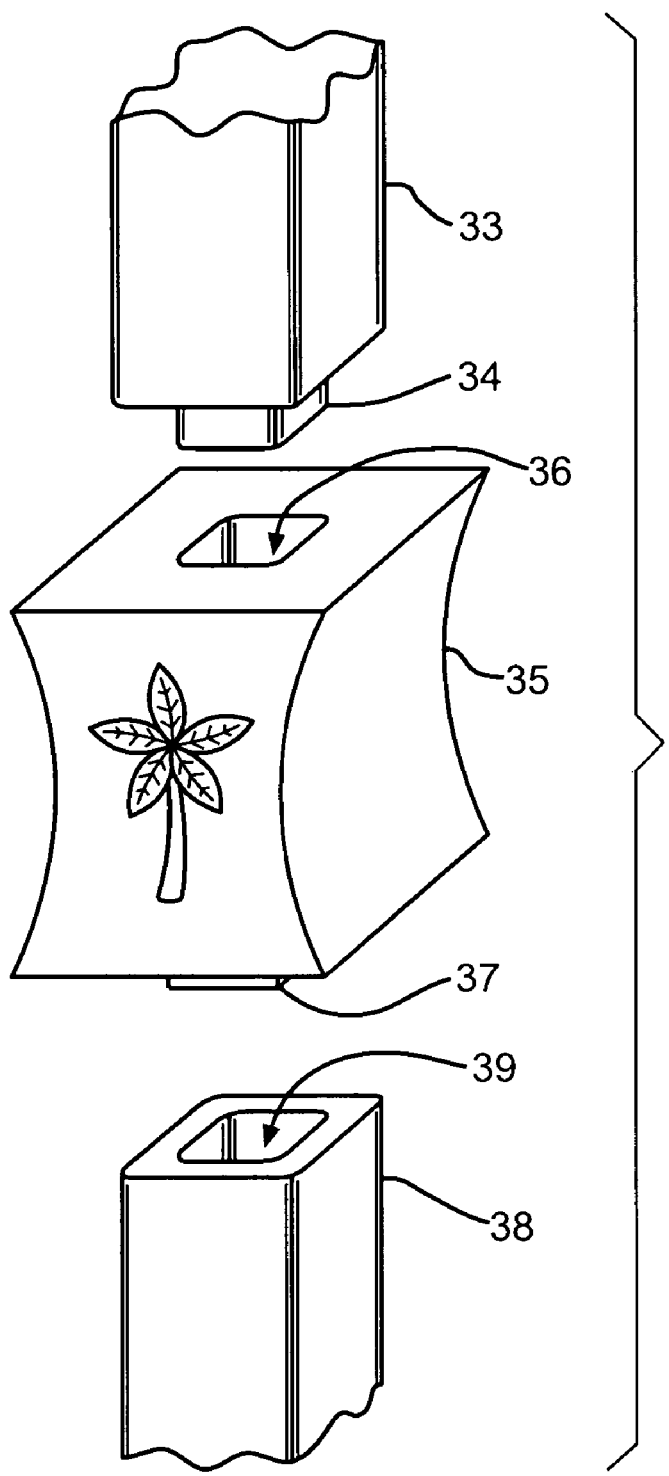
FIG. 5 is a view in perspective showing a decorative insert that can be used with a modification of the article of manufacture of FIGS. 1–4.

As shown in FIG. 5, an article 33 has a male connector 34 at one end. The article 33 has a cellular structure like the article 10, a substantially smooth and substantially impervious outer surface like the article 10, and has an interior central cavity, too. The male connector 34 may be used to facilitate the connection of the article 33 to an article 35 with a cooperating female connector 36. The article 35 may correspond with the article 10 and have a cellular structure like the article 10, a substantially smooth and substantially impervious outer surface like the article 10, and has an interior central cavity. Alternatively, the article 35 may be an entirely different type of article and might be solid. Article 35 might be electrified by wires extending into it from the central cavity (not shown) of the article 33. Article 35 might be something that is made or molded separately from the article 33 and inserted into a mold designed for producing article 33 so that as article 33 is molded it engages and becomes integral with article 35. Article 35 is shown to have a male connector 37 that might facilitate a connection between article 35 and an article 38 with a cooperating female connector 39. Alternatively, the article 35 might be produced and inserted into a mold between two cavities in the mold, one designed to produce article 33 and the other designed to produce article 38 so that articles 33 and 38 might be molded in accordance with the principles of the present invention and become integrated with the article 35 to form a unitary, structurally integral article (not shown) including articles 33, 35 and 38.

It will be appreciated that the instant invention, in one aspect, is a longitudinally extending cellular body of a wood composite based polyolefin, and that said body has at least one wall which extends at least substantially the longitudinal length of said body, and encloses a central cavity which extends for at least a substantial portion of the longitudinal length of said body, and that said body has at least one exterior surface which is smooth to the touch. It is preferred that the cellular body be produced by fluid assisted injection molding from a composite mix comprising at least ten percent by weight of wood flour, preferably at least twenty percent and, even more preferably, thirty or more percent by weight of wood flour. In a preferred embodiment, the polyolefin is polyethylene or polypropylene. In another preferred embodiment, the cellular body contains a pigment so that it can be produced by fluid assisted injection molding, and is aesthetically acceptable for use as molded. In still another preferred embodiment, the article contains a sufficient amount of a brown pigment that its color simulates that of finished natural wood. In yet another preferred embodiment, the article contains a sufficient amount of a brown pigment that its color simulates that of finished natural wood, and the article additionally contains a sufficient amount of wood flour to simulate the appearance of wood.

It will be appreciated that various changes and modifications are possible from the foregoing description of preferred embodiments of the instant invention without departing from the spirit and scope thereof as defined in the following claims. For example, a gas conduit could be provided in each of the inserts 15 and 16 and a gate could be provided near each end so that a method known in the industry as "short shot" could be used to produce an article with a discontinuous central cavity by shooting composite mix material from both ends of a longitudinally extending mold cavity towards the longitudinal center of the mold cavity with high pressure fluid such as nitrogen injected from both ends producing an article with two spaced apart central cavities and walls at least a portion of which have a cellular structure. Actually, the process described above with reference to FIG. 1 is a short shot method although an overflow or spill over could have been provided if desired. Gas assist injection molding apparatus and controls are made by Gain Technologies, Cinpres Gas Injection Ltd. and others. At least one insert is provided with a fluid conduit including a gas pin for injection of nitrogen gas. The gas pin used in this invention provided access to the interior mold cavity to push nitrogen gas into the part and exhaust the gas from the part. Also, inserts 15 and 16 can be machined to be configured to produce parts with connectors for attachment of the parts to other spindles, ornaments that are molded, or to another part such as a hand rail.

The invention claimed is:

1. A longitudinally and laterally extending cellular body of a solidified wood plastic composite comprising polyolefin and wood flour, said cellular body having gas cells dispersed not uniformly therein, said cellular body comprising at least one wall which extends at least substantially the longitudinal length of said body and encloses at least one central cavity which extends less than the length of said body,
    wherein said cavity has variations in its cross sectional dimension along the length of the body,
    wherein the cellular body has an exterior impervious integral skin made of the same wood plastic composition as the cellular body, said skin being smooth to the touch, having voids and having the appearance of wood, and
    wherein the cellular body, when struck, makes a sound like the sound of a piece of wood being struck.

2. The cellular body as claimed in claim 1 comprising at least ten percent by weight of wood flour.

3. The cellular body as claimed in claim 1 comprising at least twenty percent by weight of wood flour.

4. The cellular body as claimed in claim 1 comprising at least thirty percent by weight of wood flour.

5. The cellular body as claimed in claim 1 wherein the wood plastic composite includes polyethylene or polypropylene.

6. The cellular body as claimed in claim 5 wherein the wood plastic composite consists of wood flour and polypropylene.

7. The cellular body as claimed in claim 1 additionally containing a pigment.

8. The cellular body as claimed in claim 1 wherein said body additionally contains one or more of a fibrous glass or a mineral or a natural fiber.

9. A longitudinally and laterally extending cellular body of a solidified wood plastic composite comprising polyolefin and wood flour, said cellular body having gas cells dispersed not uniformly therein, said cellular body comprising at least one wall which extends at least substantially the longitudinal length of said body and encloses at least one central cavity which extends less than the length of said body,
    wherein said cavity has variations in its cross sectional dimension along the length of the body,
    wherein the cellular body has an exterior impervious integral skin made of the same wood plastic composition as the cellular body, said skin being smooth to the touch, having voids and having the appearance of wood, and
    wherein the cellular body, when struck, makes a sound like the sound of a piece of wood being struck,
    wherein said cellular body has a boss that defines an end of the at least one central cavity.

10. The cellular body as claimed in claim 9 wherein said boss is recessed.

11. The cellular body as claimed in claim 9 wherein there is an opening extending through said boss which opening is in communication with said at least one central cavity.

12. The cellular body as claimed in claim 9 wherein said body additionally contains one or more of a fibrous glass or a mineral or a natural fiber.

13. The cellular body as claimed in claim 9 comprising at least ten percent by weight of wood flour.

14. The cellular body as claimed in claim 9 comprising at least twenty percent by weight of wood flour.

15. The cellular body as claimed in claim 9 comprising at least thirty percent by weight of wood flour.

* * * * *